July 2, 1963        T. R. BREUNICH        3,095,849
STEERING APPARATUS FOR OUTBOARD MOTORS
Filed July 27, 1961        3 Sheets-Sheet 3
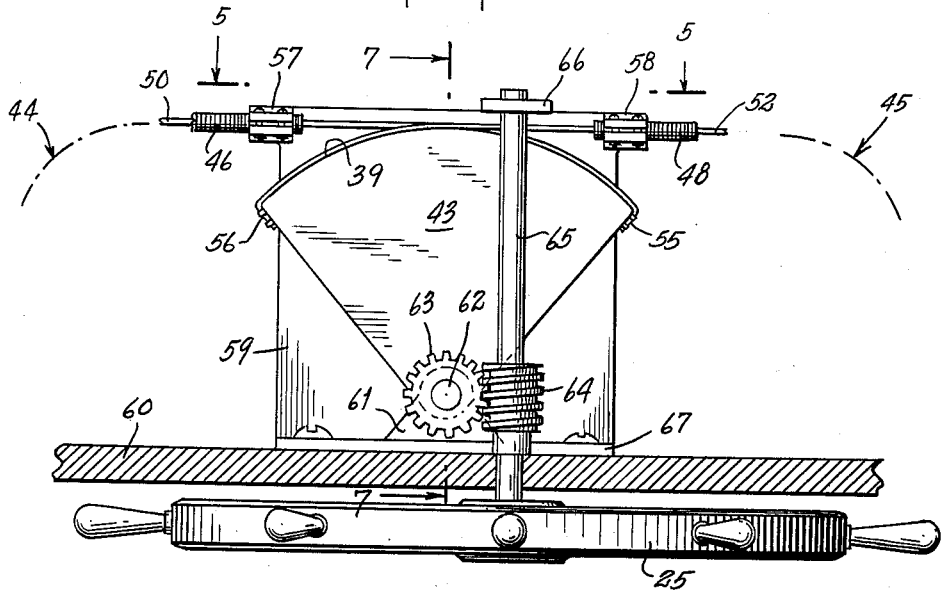
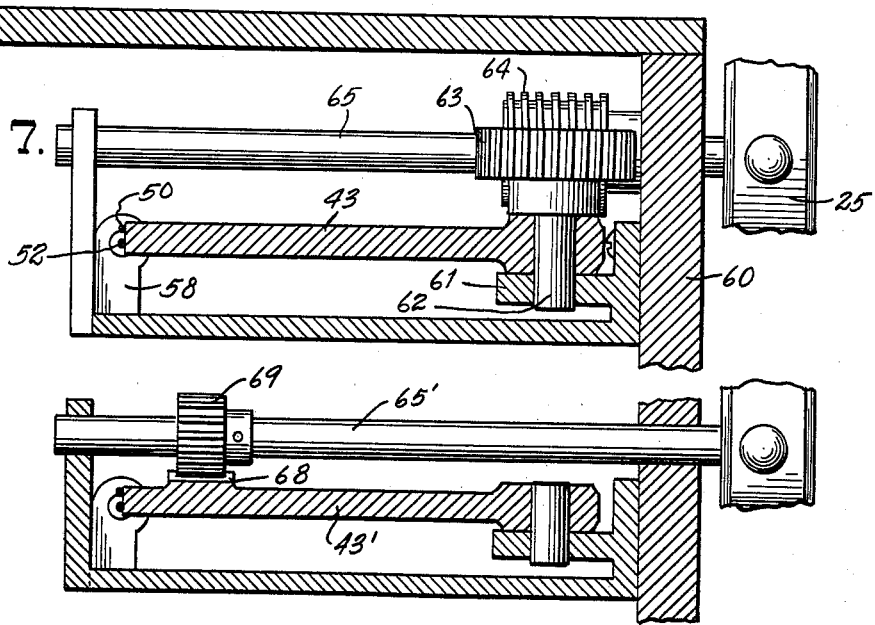
INVENTOR.
THEODORE R. BREUNICH
BY John J. Hart and
Dayton R. Stemple Jr.
ATTORNEYS United States Patent Office 3,095,849
Patented July 2, 1963

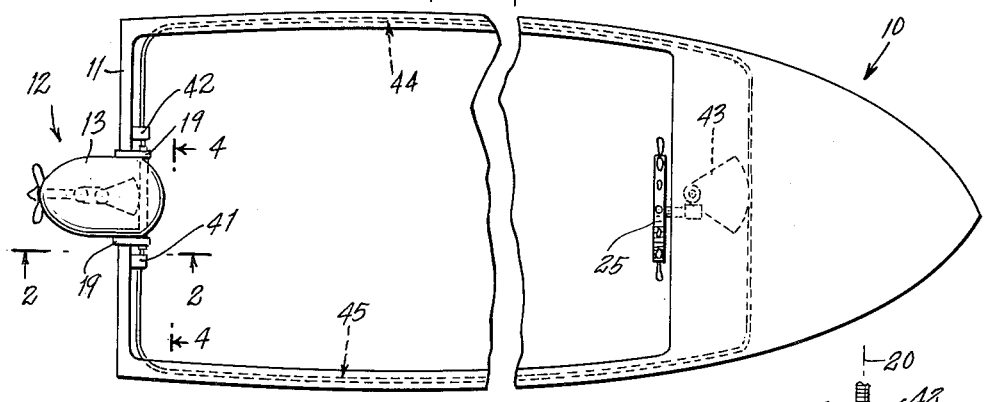
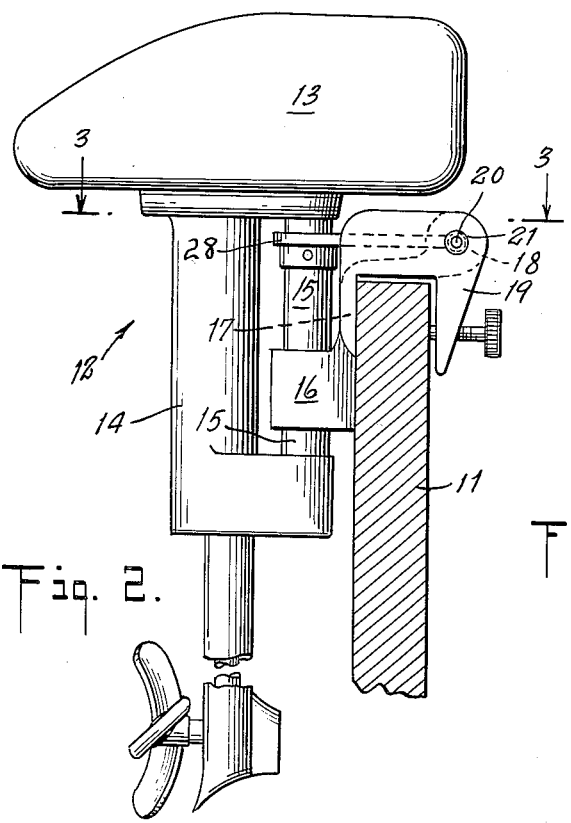
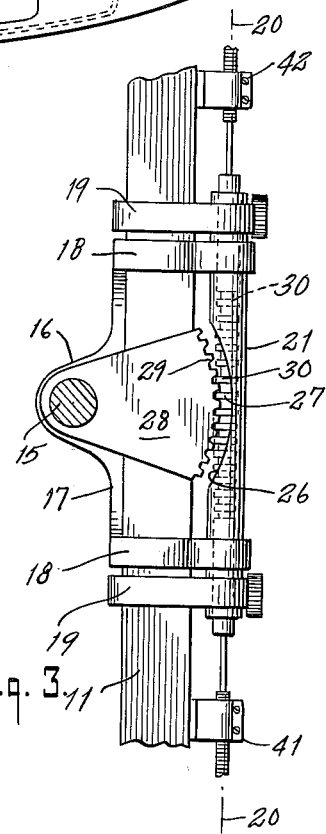

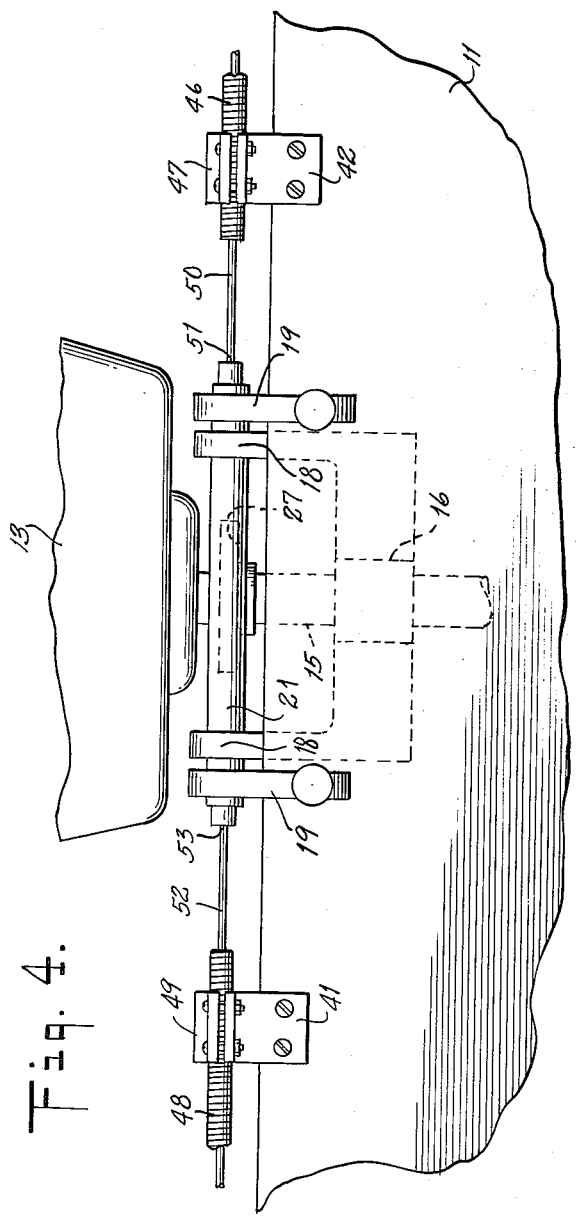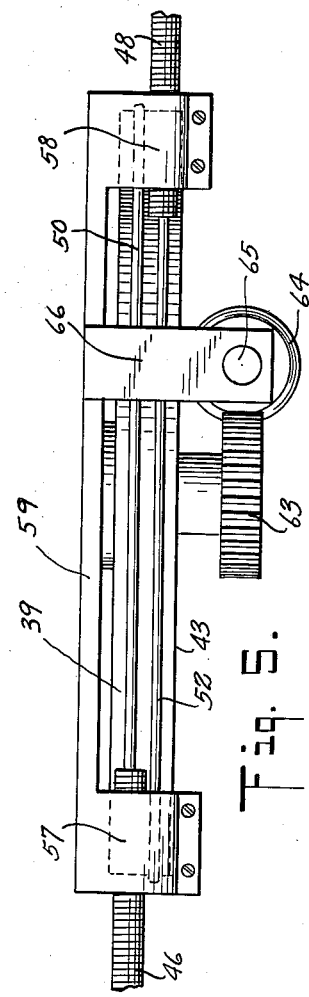

3,095,849
STEERING APPARATUS FOR OUTBOARD MOTORS
Theodore R. Breunich, Stamford, Conn., assignor to Controlex Corporation of America, White Plains, N.Y., a corporation of New York
Filed July 27, 1961, Ser. No. 127,399
12 Claims. (Cl. 115—18)

This invention relates to apparatus for controlling the steering of an outboard motor from a place remotely located from the motor itself.

The usual systems employed in steering outboard motors from a remote place of control include either a rope or cable, or a push-pull cable. Both of these systems, as presently constructed, have the disadvantage that their steering actions are not uniform throughout all degrees of turn of the steering wheel. Thus, in the use of these systems a 10° turn of the steering wheel at midstroke gives a motor turn of 10°, but a 10° turn of the wheel at 50° gives less than a 10° turn of the motor. This is due to the manner in which these systems are connected to the motor and which make the same essentially lever systems of a type that give a sine motion to the steering action. In this connection also, the usual rope system has the further disadvantage that in the steering operations thereof the length of the rope is caused to be changed and this results in either the rope being stretched or the incorporation of springs in the system to avoid such stretch. Both these systems, as presently employed, further require that special provision be made in their constructions to permit the motor to be tilted, and the constructions so far devised to take care of this action of the motor have rendered these systems bulky and complicated and more likely to incur damage in use.

One of the objects of the present invention is to provide an improved steering system wihch will overcome the aforesaid difficulties and disadvantages of known systems.

Another object of the invention is to provide an improved steering system constructed to provide a steering action of uniform angular motion throughout the full travel or range of movement of the steering wheel.

A further object of the invention is to provide an improved steering system for outboard motors and constructed to apply the steering control for such a motor at the tilting axis thereof and in such manner that the operating members of such system do not participate in the tilting movements of the motor about such axis.

Other objects of the invention as well as the advantages and features of construction thereof will become apparent from the following description when read in connection with the accompanying drawings, in which FIG. 1 is a top plan view of a conventional boat embodying the steering system of this invention;

FIG. 2 is a side elevational view of the outboard motor unit looking along the line 2—2 in FIG. 1 and illustrating the manner in which the system is connected to the motor unit at the tilting axis thereof;

FIG. 3 is a sectional view taken along the line 3—3 of FIG. 2;

FIG. 4 is an elevational view looking along the line 4—4 of FIG. 1 and illustrating the immediate mechanism for controlling the action of the parts at the tilting axis of the motor;

FIG. 5 is an outer-end elevational view of the steering mechanism shown in FIG. 6, the view being taken along the line 5—5 in such latter figure;

FIG. 6 is a top plan view of the elements of the steering system associated with the steering wheel;

FIG. 7 is a sectional view taken along the line 7—7 in FIG. 6, and

FIG. 8 is a view similar to FIG. 7 showing a modification of the invention.

In the drawings, the reference numeral 10 indicates generally a boat of conventional construction and provided with a transom 11 for supporting an outboard motor unit indicated generally by the numeral 12. The motor unit is of generally conventional construction and includes a motor 13 from which extends downwardly a housing 14 through which extends the propeller shaft. The unit is further provided with a vertical post 15 which is rotatably supported by a bearing 16 provided on the lower end of a bracket member 17 to enable the motor unit to be pivoted about a vertical axis for steering the boat, as is conventional. Provided on the upper end of the bracket member 17 are a pair of lugs 18, 18 which are pivotally connected to a pair of clamp members 19, 19 to enable the motor unit to be tilted about a horizontal axis 20—20. The clamp members 19, 19 are secured to the boat transom 11 in a conventional manner. The bracket member 17 is pivotally connected to the clamp members 19, 19 through an elongated tube 21 which is fixed with relation to the lugs 18, 18 of such bracket member 17 and is rotatably supported by the clamp members 19, 19.

The tube 21 also forms part of the steering system for pivoting the motor unit 12 about the longitudinal vertical axis of post 15 from a place remote from such motor unit, as from a steering wheel 25 mounted in the forward end of the boat as is shown in FIG. 1 of the drawings. It will be noted more clearly in FIG. 3 of the drawings, that the tube 21 is cut away between the bracket legs 18, 18 to provide an elongated opening 26 which permits interengagement of a rack 27 extending through such tube with a steering arm or quadrant 28. The quadrant 28 is fixed at one end to the post 15 and normally extends substantially horizontally across the boat transom 11 into engagement with the rack 27. The rack engaging end of the quadrant 28 is provided with gear teeth 29 arranged along a convex curve the radii of which center at the vertical axis of the post 15. Thus when the quadrant 28 which is in the nature of a gear segment, is actuated by the rack 27, it turns about the vertical axis of post 15 to cause such post and the motor unit to turn about such axis which constitutes the steering axis of such unit.

The rack 27 is a round rack provided with spaced circular teeth 30 which enable the quadrant 28 to pivot about the longitudinal axis 20—20 of the tube 21 when the motor unit is tilted about such axis without moving the rack 27 and without detracting from the effectiveness of steering operations of such quadrant. The opening 26 in the tube 21 is configured to enable the gear teeth 29 of the quadrant to move freely relative to the rack teeth 30 throughout the given range of pivotal movement of the motor unit and at any angle of tilt thereof about axis 20—20. The rack 27 is slidably mounted in the tube 21 and is actuated lengthwise by a pair of flexible cables indicated generally in FIG. 1 by the numerals 44 and 45 and connected at their remote ends to a second quadrant 43 associated with the steering wheel 25.

The flexible cables 44 and 45 may be of any suitable construction such as shown for example in Patent No. 2,841,029 issued July 1, 1958 and in Patent No. 2,845,813 issued August 5, 1958. As is usual in such constructions, each cable includes a flexible tubular member or sheath within which is slidably mounted a push-pull flexible rod. In the construction herein disclosed, the sheath 46 of the cable 44 is secured at one end to a supporting plate 42 mounted to one side of rack 27 on the inner wall of the transom 11 by means of a clamp 47 provided on the upper end of such plate. In a similar manner one end of the sheath 48 of the cable 45 is secured in opposed aligned relation to the end of sheath 46 by a clamp 49 provided on the upper end of a plate 41 which is also mounted on the inner wall of the transom 11, but located on the other side of rack 27. The control rod 50 of cable 44 extends outwardly to the left beyond the clamped end of its associated sheath 46, as viewed in FIG. 4, and is connected at its end 51 to the adjacent end of rack 27 in any suitable manner. In a somewhat similar fashion, the control rod 52 of cable 45 extends outwardly to the right, as viewed in FIG. 4, beyond the clamped end of its associated sheath 48 and is connected at its end 53 to the other end of rack 27. Accordingly, when one rod is pulled and the other rod correspondingly pushed by the second quadrant 43 in a manner which will be hereinafter more fully explained, the rack 27 is caused to be moved through a corresponding distance. As the rack 27 slides through such distance, the quadrant 28 will be pivoted through an angle corresponding to that through which quadrant 43 moved to turn the motor unit. As a result of this construction, the motor unit will be turned by the quadrant 28 at a constant radius as the rack 27 is caused to slide in the tube 21 and therefore will provide a uniform angular response for such movements of the rack. The effective radius of the quadrant 28 may be correlated to the effective radius of the quadrant 43 to provide a given response of the motor unit to a movement of quadrant 43 and the steering wheel 25.

The other ends of the cable sheaths 46 and 48 are secured in opposed aligned relation by clamps 57 and 58, respectively, provided at the outer ends of the side edges of a support plate 59 secured in horizontal position to the bulkhead 60 of the boat. The plate 59 is provided with a bearing lug 61 for rotatably receiving a vertical pin 62 to which is secured the apex of the quadrant 43. Also secured to pin 62 is a worm wheel 63 which is in engagement with a worm 64 mounted on the steering wheel shaft 65. Wheel shaft 65 is rotatably supported by the bearing lug 66 and bracket flange 67 integral with plate 59.

As is shown more clearly in FIGS. 5 and 6 of the drawings, the convex edge 39 of quadrant 43 extends through a substantial angle, from 60° to 90°, and is of substantial width. The control rod 50 of cable 44 extends outwardly to the right beyond the clamped end of its associated sheath 46, as viewed in FIGS. 5 and 6, into engagement with the edge 39 of quadrant 43 and extends from thence in close contact with such edge to the right hand end thereof. The outer end 55 of the rod 50 is turned down against and secured to the adjacent side edge of such quadrant in any suitable manner, as by screws. In a somewhat similar fashion, the control rod 52 of cable 45 extends outwardly to the left, as viewed in FIGS. 5 and 6, beyond the clamped end of its associated sheath 48 into engagement with the edge 39 of quadrant 43 and thence along such edge to the left hand end thereof where the outer end 56 of such control rod is secured to the other side edge of such quadrant. It will be noted that in this construction, the control rods 50 and 52 which extend in opposed directions on the curved edge 39 of quadrant 43, are tangent to such arcuate edge at the common place of engagement therewith, and are substantially aligned from such common place of engagement to the clamped ends of the associated sheaths thereof. As the quadrant 43 rotates about its pivot 62, it will be understood that the common place of tangency of the control rods 50 and 52 with the edge 39 of quadrant 43 thereof will shift in one direction or the other depending upon the movements of such rods and the consequent angular movement of quadrant 43.

It will be understood from the foregoing, that when the steering wheel 25 is turned in one direction or the other by the operator, the worm 64 will turn its associated wheel 63 to rotate pin 62 and consequently the quadrant 43 in a corresponding direction to push one of the rods 50, 52 and to pull the other of such rods. These movements of the control rods 50 and 52 are utilized to actuate rack 27 in the manner previously explained to steer the motor unit. The worm 64 and worm wheel 63 are constructed in a manner known in the art so that they are readily operated through the steering wheel to move the motor unit easily to obtain the desired steering action, but are self locking against any loads that might be applied thereto from the motor unit by reason of its adjusted position.

It will be observed from the foregoing description of the apparatus of this invention that it provides a working or effective lever which is of constant length throughout its range of movements and therefore provides a uniform steering action throughout the entire range of operation of the system. As the quadrant 43 forms an integral part of the control mechanisms and supports the portions of the rods connected thereto in a straight line, such connecting portions are of minimum length and need not be strong and rigid. In fact, the construction herein enables a light wire or rope to be used to equal advantage when it is desired to provide a construction of exceptional simplicity and economy. By applying the turning power of the wheel 25 and quadrant 43 at the tilting axis of the motor unit, any motion of the control mechanisms while the motor unit is being tilted, is eliminated, thus making it possible to utilize in the system cables of given length and to eliminate the need of complicated and bulky linkages therein. Further, the steering operations of the system are uneffected by the degree of tilt of the motor unit.

While I have hereinabove described and illustrate in the drawings, a preferred embodiment of my invention, it will be apparent to those skilled in the art that various changes therein and modifications thereof may be made without departing from the spirit of the invention or the scope of the appended claims. Thus, as is shown in FIG. 8 of the drawings, the worm 64 and worm wheel 63 may be replaced by a curved line of gear teeth 68 provided on the quadrant 43' and a bevel gear 69 provided on the steering wheel shaft 65'. In all other respects the system may be constructed in the manner above described.

I claim:

1. Steering apparatus for remotely controlling the steering of an outboard motor comprising, in combination, a motor unit, means supporting said motor unit for rotational movement about a steering axis, said motor unit including a post whose longitudinal axis coincides with said steering axis, and said supporting means comprising a hanger bracket provided with a bearing for rotatably supporting said post for rotational movement about the longitudinal axis thereof, means hingedly connecting said supporting means to a boat to enable said supporting means and said motor unit to be moved about a tilting axis, a rigid steering lever in the form of a quadrant fixed to said post so as to be rotatable with said motor about said steering axis, said quadrant extending from said post to said tilting axis and having an outer arcuate end substantially tangential to said tilting axis and connected at the tilting axis for pivotal movement with said motor about said tilting axis, and movable means coacting with the arcuate end of said quadrant and operable to rotate said quadrant, said post and said motor about said steering axis regardless of the disposition of said quadrant relative to said tilting axis.

2. Steering apparatus such as defined in claim 1, in which said quadrant is constituted of a gear segment and in which said movable means comprises a rack whose longitudinal axis coincides with said tilting axis and which is slidable along its longitudnal axis, the teeth on said rack being in engagement with the teeth on said gear segment and constructed to enable said gear segment to pivot about said tilting axis without longitudinal movement of said rack.

3. Steering apparatus for remotely controlling the steering of an outboard motor comprising, in combination, a motor unit, means supporting said motor unit for rotational movement about a steering axis, means hingedly connecting said supporting means to a boat to enable said supporting means and said motor unit to be moved about a tilting axis, a rigid steering lever having one point thereof connected to said motor at the rotating axis of the latter so as to be rotatable with said motor about said axis, said lever extending from said rotating axis to said tilting axis and having a spaced point thereof connected to the tilting axis so as to be pivotal with said motor about said tilting axis, and means connected to said lever at said tilting axis and operable to rotate said steering lever and said motor about said steering axis regardless of the disposition of said lever relative to said tilting axis.

4. Steering apparatus for remotely controlling the steering of an outboard motor comprising, in combination, a motor unit, means supporting said motor unit for rotational movement about a steering axis, means hingedly connecting said supporting means to a boat to enable said supporting means and said motor unit to be moved about a tilting axis, a steering member fixed to said motor unit so as to be rotated about said steering axis and pivoted about said tilting axis, and means movable in the direction of said tilting axis and operable to rotate said steering member about said steering axis regardless of the disposition of said member relative to said tilting axis, said movable means including slidable means movable along said tilting axis and operatively connected to said steering member to rotate the latter in the sliding movements thereof, said steering member being pivotally movable on said slidable means without effecting the sliding movements of the latter.

5. Steering apparatus such as defined in claim 4, in which said steering member is constituted of a gear segment and in which said slidable means comprises a round rack having annular teeth in engagement with the gear teeth on said segment.

6. Steering apparatus for remotely controlling the steering of an outboard motor comprising, in combination, means hinged for pivotal movement about the tilting axis of the motor unit and supporting such unit for rotational movement about a steering axis, second means secured to the motor unit at said steering axis so as to be rotatable with the motor about such axis, and extending to and pivotal with said motor unit about said tilting axis, and means connected to said second means at said tilting axis and operable thereat to rotate said second means about said steering axis and thereby rotate the motor unit about such axis, said second means being pivotally movable relative to said operable means about said tilting axis without disturbing the operable connection therebetween.

7. Steering apparatus for remotely controlling the steering of an outboard motor comprising, in combination, means hinged for pivotal movement about the tilting axis of the motor unit and supporting such unit for rotational movement about a steering axis, second means secured to the motor unit at said steering axis and pivotal about said tilting axis, and means at said tilting axis and operable to rotate said second means about said steering axis and thereby rotate the motor unit about such axis, said second means being pivotally movable relative to said operable means about said tilting axis without disturbing the operable connection therebetween, and said operable means comprising an elongated member having a longitudinal axis in the region of said tilting axis substantially coinciding with the latter, a pivotally movable quadrant connected to said elongated member to move the latter longitudinally of said tilting axis, and means operable at a place remote from said motor for pivoting said quadrant in correspondence with steering requirements.

8. Steering apparatus such as defined in claim 7, in which said elongated member comprises a rack interengaged with said second means, and in which said second mentioned operable means includes a pair of connecting members, each connected at one end to one end of said rack and each connected at its other end to said quadrant so that as the latter is moved about its pivot said rack is slidably moved longitudinally to rotate said second means, and steering means at said remote place connected to and controlling the pivotal movements of said quadrant so that a pivotal movement of said steering means causes a corresponding pivotal movement of said quadrant.

9. Steering apparatus such as defined in claim 8, in which said members connecting said rack and quadrant are elongated flexible members extending from said rack to said remote place and at the latter are connected at their other ends to said quadrant so that one of said flexible members will exert a pulling force on said rack whenever said quadrant is pivotally moved.

10. Steering apparatus such as defined in claim 9, in which said flexible members are constituted of push-pull control cables the ends of the flexible rods thereof which are associated with said quadrant, being directed in opposed, substantially aligned relation toward a common place of tangency on the arcuate edge of such quadrant and then continuing in opposite diverging directions on such edge toward the ends of the latter, the terminal ends of such rods being secured to said quadrant.

11. Steering apparatus such as defined in claim 10, including a support plate associated with said quadrant and adapted to be mounted on the boat, means on said plate for pivotally supporting its associated quadrant at the apex thereof, and clamping means provided on said plate in associated relation with the arcuate edge of said quadrant, and in which the associated ends of the sheaths for the flexible rods of said control cables are secured by said clamping means to said plate in opposed aligned relation.

12. Steering apparatus for remotely controlling the steering of an outboard motor comprising, in combination, means hinged for pivotal movement about the tilting axis of the motor unit and supporting such unit for rotational movement about a steering axis, second means secured to the motor unit at said steering axis and pivotal about said tilting axis, and means at said tilting axis and operable to rotate said second means about said steering axis and thereby rotate the motor unit about such axis, said second means being pivotally movable relative to said operable means about said tilting axis without disturbing the operable connection therebetween, and said operable means comprising an elongated member having a longitudinal axis in the region of said tilting axis substantially coinciding with the latter, a pivotally movable quadrant connected to said elongated member to move the latter longitudinally of said tilting axis, and means operable at a place remote from said motor for pivoting said quadrant in correspondence with steering requirements, said last mentioned means including a steering wheel, a steering wheel shaft, a worm on said shaft, and gear teeth arranged on said quadrant in concentric relation about the pivotal axis thereof and interengaged with said worm, said gear teeth and worm being constructed to be self locking against any loads applied to said operable means by said motor unit when said steering wheel is released.

References Cited in the file of this patent
UNITED STATES PATENTS

| | | |
|---|---|---|
| 1,843,272 | Evinrude | Feb. 2, 1932 |
| 2,891,498 | Schroeder | June 23, 1959 |
| 2,961,986 | Rockhill | Nov. 29, 1960 |